US011659336B2

(12) United States Patent
Wang et al.

(10) Patent No.: US 11,659,336 B2
(45) Date of Patent: May 23, 2023

(54) VIBRATION APPARATUS, MOBILE TERMINAL AND METHOD FOR CONTROLLING THE MOBILE TERMINAL

(71) Applicant: VIVO MOBILE COMMUNICATION CO., LTD., Guangdong (CN)

(72) Inventors: Zhiyuan Wang, Guangdong (CN); Xinkun Cheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 80 days.

(21) Appl. No.: 17/462,411

(22) Filed: Aug. 31, 2021

(65) Prior Publication Data

US 2021/0400393 A1   Dec. 23, 2021

Related U.S. Application Data

(63) Continuation-in-part of application No. PCT/CN2020/076147, filed on Feb. 21, 2020.

(30) Foreign Application Priority Data

Mar. 1, 2019   (CN) .......................... 201910156195.1

(51) Int. Cl.
*H04R 9/10* (2006.01)
*H04M 1/03* (2006.01)
(Continued)

(52) U.S. Cl.
CPC ................ *H04R 9/10* (2013.01); *H04M 1/03* (2013.01); *H04R 3/007* (2013.01); *H04R 9/063* (2013.01)

(58) Field of Classification Search
CPC .......... H04R 9/10; H04R 3/007; H04R 9/063; H04R 9/025; H04R 9/04; H04R 9/041; H04R 2209/041; H04M 1/03
See application file for complete search history.

(56) References Cited

U.S. PATENT DOCUMENTS

2007/0183620 A1* 8/2007 Stiles .................... H04R 9/046
                                                              381/401
2008/0216578 A1* 9/2008 Takashima ............. G06F 3/016
                                                              73/649

FOREIGN PATENT DOCUMENTS

CN          201001193 Y    1/2008
CN          101365256 A    2/2009
(Continued)

OTHER PUBLICATIONS

English machine translation of CN 20683537 (Wang et al., Be applied to two unification drivers of sound production vibration on touch-sensitive screen, published Jan. 2018) (Year: 2018).*

(Continued)

*Primary Examiner* — Mark Fischer
(74) *Attorney, Agent, or Firm* — IP & T Group LLP

(57) ABSTRACT

A vibration apparatus includes a substrate, an elastic piece, a magnetic component and at least two coils. The substrate abuts on a display panel of a mobile terminal; the at least two cods are fixed on an inner side surface of the substrate; the inner side surface faces away from the display panel; the at least two coils are disposed coaxially; and axes of the at least two coils are perpendicular to the substrate. A first side surface of the elastic piece abuts on the inner side surface of the substrate; the magnetic component is connected to a second side surface of the elastic piece; the second side surface is disposed away from the first side surface. The at least two cods are at least in part accommodated in an annular accommodating groove of the magnetic component.

17 Claims, 2 Drawing Sheets

(51) Int. Cl.
    *H04R 3/00*     (2006.01)
    *H04R 9/06*     (2006.01)

(56) References Cited

FOREIGN PATENT DOCUMENTS

| | | |
|---|---|---|
| CN | 203206458 U | 9/2013 |
| CN | 204810530 U | 11/2015 |
| CN | 206835357 U | 1/2018 |
| CN | 108600457 A | 9/2018 |
| CN | 108616797 A | 10/2018 |
| CN | 108877597 A | 11/2018 |
| CN | 109032257 A | 12/2018 |
| CN | 109981856 A | 7/2019 |
| JP | 2014-207846 A | 10/2014 |
| WO | 01/41322 A1 | 6/2001 |
| WO | 2013/103278 A1 | 7/2013 |

OTHER PUBLICATIONS

English machine translation of CN 204810530 (LV, Vibrating device and electronic equipment, published Aug. 2007) (Year: 2007).*
International Search Report of International Application No. PCT/CN2020/076147 dated May 11, 2020.
Written Opinion of The International Searching Authority of International Application No. PCT/CN2020/076147 dated May 11, 2020.
First Office Action of Priority Application No. CN 201910156195.1 dated Mar. 25, 2020.
The Second Office Action of Priority Application No. CN 201910156195.1 dated Sep. 21, 2020.
Notification to Grant Patent Right for Invention of Priority Application No. CN 201910156195.1 dated Jan. 29, 2021.

* cited by examiner

VIBRATION APPARATUS, MOBILE TERMINAL AND METHOD FOR CONTROLLING THE MOBILE TERMINAL

CROSS-REFERENCE TO RELATED APPLICATIONS

This application is a Bypass Continuation-in-part Application of PCT/CN2020/076147 filed on Feb. 21, 2020, which claims priority to Chinese Patent Application No. 201910156195.1 filed on Mar. 1, 2019, which are incorporated herein by reference in their entirety.

TECHNICAL FIELD

The present disclosure relates to the field of communications technologies, and in particular, to a vibration apparatus, a mobile terminal and a method for controlling the mobile terminal.

BACKGROUND

To meet people's demand for a high screen-to-body ratio of a mobile terminal, a large-screen mobile terminal rises to the occasion. Currently, for most large-screen mobile terminals, a vibrator is usually added to drive a screen to sound. In addition, to meet a general vibration requirement of a mobile terminal, a motor is also mounted to be used when the mobile terminal is in a vibration mode or gives a vibration reminder. However, arrangement of the vibrator and the motor increases hardware costs of the mobile terminal, and occupies an inner space of the mobile terminal.

SUMMARY

Embodiments of the present disclosure provide a vibration apparatus, a mobile terminal and a method for controlling the mobile terminal.

According to a first aspect, an embodiment of the present disclosure provides a vibration apparatus. The vibration apparatus includes:

a substrate abutting on a display panel of a mobile terminal, where the substrate is parallel to the display panel;

at least two coils fixed on an inner side surface of the substrate, where the inner side surface faces away from the display panel, the at least two coils are disposed coaxially, and axes of the at least two coils are perpendicular to the substrate;

an elastic piece, where a first side surface of the elastic piece abuts on the inner side surface of the substrate; and a magnetic component connected to a second side surface of the elastic piece, where the magnetic component includes an accommodating groove, and the at least two coils are at least in part accommodated in the accommodating groove, where the second side surface is disposed away from the first side surface, the vibration apparatus has at least a first working mode and a second working mode, and numbers of coils electrified when the vibration apparatus is in the first working mode is not equal to numbers of coils electrified when the vibration apparatus is in the second working mode.

According to a second aspect, an embodiment of the present disclosure further provides a mobile terminal, including a display panel and the vibration apparatus according to the first aspect, where the substrate of the vibration apparatus abuts on an inner side of the display panel.

According to a third aspect, an embodiment of the present disclosure further provides a method for controlling a mobile terminal, applied to the mobile terminal according to the second aspect, where the method includes:

when it is detected that the mobile terminal is in the first working mode, controlling a first quantity of coils in the at least two coils of the vibration apparatus to be in an electrified state, so that the vibration apparatus works as a sound generator; and when it is detected that the mobile terminal is in the second working mode, controlling a second quantity of coils in the at least two coils of the vibration apparatus to be in the electrified state, so that the vibration apparatus works as a motor, where the first quantity is not equal to the second quantity.

According to a fourth aspect, an embodiment of the present disclosure further provides a mobile terminal, including a processor, a memory, and a program that is stored in the memory and that can run on the processor. When the program is executed by the processor, the steps of the method for controlling a mobile terminal according to the third aspect are implemented.

According to a fifth aspect, an embodiment of the present disclosure further provides a computer-readable storage medium, where the computer-readable storage medium stores a program, and when the program is executed by a processor, the steps of the method for controlling a mobile terminal according to the third aspect are implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
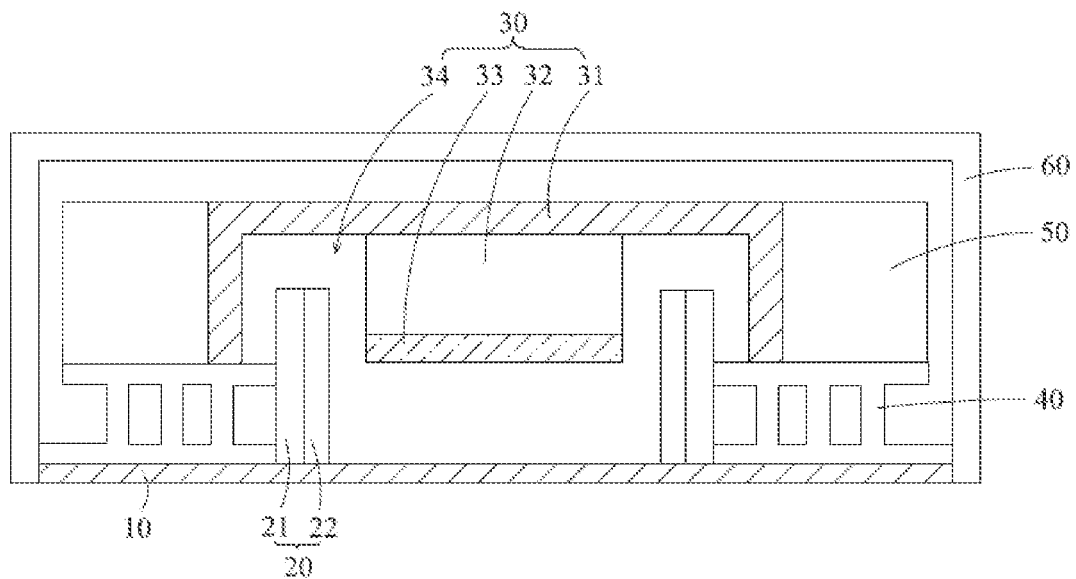
FIG. 1 is a structural diagram of a cross section of a vibration apparatus according to an embodiment of the present disclosure.

Referring to FIG. 1, which is a structural diagram of a vibration apparatus applied to a mobile terminal according to an embodiment of the present disclosure. As shown in FIG. 1, the vibration apparatus includes a substrate 10, an elastic piece 40, a magnetic component 30 and at least two coils 20. The substrate 10 abuts on a display panel 70 of the mobile terminal and is parallel to the display panel of the mobile terminal; the at least two coils 20 are fixed on an inner side surface of the substrate 10; the inner side surface faces away from the display panel; the at least two coils 20 are disposed coaxially; axes of the at least two coils 20 are perpendicular to the substrate 10; a first side surface of the elastic piece 40 abuts on the inner side surface of the substrate 10; the magnetic component 30 is connected to a second side surface of the elastic piece 40; the magnetic component 30 includes an annular accommodating groove 34; and the at least two coils 20 are at least in part accommodated in the accommodating groove 34. The first side surface and the second side surface of the elastic piece 40 are disposed back to back.

It may be understood that a coil generates a magnetic field when it is in an electrified state. In this embodiment of the present disclosure, the at least two coils 20 are accommodated in the annular accommodating groove 34 of the magnetic component 30. When any numbers of coils in the at least two coils 20 are in the electrified state, according to a principle that an electrified wire performs movement of cutting a magnetic induction line in a magnetic field, because the at least two coils 20 are fixed on the substrate 10, the at least two coils 20 cannot move relative to the substrate 10, the magnetic component 30 moves under the action of reaction force of Ampere force, and then drives the elastic piece 40 connected thereto to move; and then, the elastic piece 40 pushes the substrate 10 abutting thereon to move, so that the substrate 10 can drive the display panel abutting thereon to move. When an alternating current flows through the coils, directions of magnetic induction lines generated by the coils change, and a movement direction of the magnetic component 30 also changes. Therefore, the magnetic component 30 vibrates regularly in opposite directions, and further drives the display panel to vibrate regularly, so that the display panel can sound.

It should be noted that, a principle of a sound generator in the mobile terminal is similar to a principle of a vibrator in a motor. Both the sound generator and the vibrator use the Ampere's law. A value of Q represents a degree to which the vibrator is affected by mechanical damping and electrical damping at a resonance frequency point $f_0$. When the motor works in a resonance region near $f_0$, vibration of the motor is relatively strong and it is usually expected that a value of Q of the motor is higher, so that a response is faster, and an amplitude is larger. When the sound generator works at a frequency band behind it is usually expected that a value of Q is lower, so that a frequency response is flatter, and produced sound sounds more comfortable.

Expressions of the value of Q are:

$$\frac{1}{Q_{ts}} = \frac{1}{Q_{ms}} + \frac{1}{Q_{es}};$$

$$Q_{ms} = \frac{R_{es}}{(Bl)^2} \sqrt{\frac{M_{ms}}{C_{ms}}};$$

$$Q_{es} = \frac{R_e}{(Bl)^2} \sqrt{\frac{M_{ms}}{C_{ms}}};$$

$$Q_{ts} = \frac{R_e R_{es}}{(R_e + R_{es})(Bl)^2} \sqrt{\frac{M_{ms}}{C_{ms}}},$$

where $R_e$ represents DC resistance of a coil; $R_{es}$ represents electrical resistance derived from equivalent mechanical resistance of a vibration system; $M_{ms}$ represents a vibration mass; $C_{ms}$ represents compliance of an elastic sheet, that is, a reciprocal of a stiffness coefficient K; Bl represents a product of strength of a magnetic field generated by the magnetic component 30 and a length of a coil in the magnetic field; and according to the formula F=IBl, Bl is proportional to driving force. It can be learned from the foregoing formula that the value of Q varies according to Bl.

In this embodiment of the present disclosure, the vibration apparatus has at least a first working mode and a second working mode. Numbers of coils electrified when the vibration apparatus is in the first working mode is not equal to numbers of coils electrified when the vibration apparatus is in the second working mode.

For example, the quantity of the coils electrified when the vibration apparatus is in the first working mode is larger than the quantity of the coils electrified when the vibration apparatus is in the second working mode. In this case, it can be learned from the foregoing formula that, a value of Q when the vibration apparatus is in the first working mode is smaller than a value of Q when the vibration apparatus is in the second working mode. Therefore, the vibration apparatus can work as a sound generator when the mobile terminal is in the first working mode, or work as a motor when the mobile terminal is in the second working mode. In this way, functions of a motor and a sound generator can be implemented at the same time when there is only one vibration apparatus in a mobile terminal, which not only reduces hardware costs of the mobile terminal, but also saves an installation space in the mobile terminal. In addition, when working as a sound generator, the vibration apparatus can sound by driving the display panel to vibrate, that is, there is no need to form a hole in the display panel of the mobile terminal for arrangement of a separate sounding apparatus, so that the display panel of the mobile terminal can have a larger display area.

That the vibration apparatus works as the motor when the mobile terminal is in the second working mode means that the vibration apparatus can drive the entire mobile terminal to vibrate, so as to give a user a reminder, for example, a call reminder, a message reminder, or a clock reminder.

As an optional implementation, referring to FIG. 1, the at least two coils 20 include a first coil 21 and a second coil 22; both the first coil 21 and the second coil 22 are in an electrified state when the vibration apparatus is in the first working mode; and the first coil 21 or the second coil 22 is in the electrified state when the vibration apparatus is in the second working mode.

When the vibration apparatus is in the first working mode, both the first coil 21 and the second coil 22 are in the electrified state. Therefore, strength of magnetic fields of the coils of the vibration apparatus is high, the coils are long, and the value of Q of the vibration apparatus is small. In this case, the vibration apparatus works as the sound generator. When the vibration apparatus is in the second working mode, the first coil 21 is in the electrified state. Therefore, the strength of the magnetic fields of the coils of the vibration apparatus is low, the coils are short, and the value of Q of the vibration apparatus is large. In this case, the vibration apparatus works as the motor.

When the vibration apparatus is in the first working mode, the first coil 21 is connected in series or parallel to the second coil 22.

Figure 2:
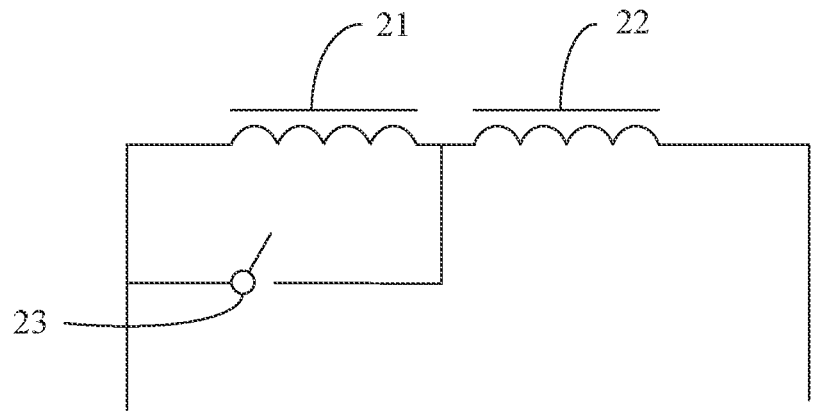
FIG. 2 is a circuit connection diagram of a first coil and a second coil of the vibration apparatus in FIG. 1.

Referring to FIG. 2, the first coil 21 is connected in series to the second coil 22, and the first coil 21 is connected in parallel to a first switch 23. The first coil 21 and the second coil 22 may be electrified through connection to a circuit board (which may be an integrated circuit board) in the mobile terminal. For a connection manner, refer to a manner of connecting a coil to a circuit board in the related art. When the vibration apparatus needs to work as a sound generator, the first switch 23 is in an off state, and both the first coil 21 and the second coil 22 are in the electrified state. When the vibration apparatus needs to work as a motor, the first switch 23 is in an on state, and the second coil 22 is in the electrified state. On/off of the first switch 23 may be controlled by a processor in the mobile terminal. In this way, the vibration apparatus can work as the motor or the sound generator by switching on or off the first switch 23.

Figure 3:
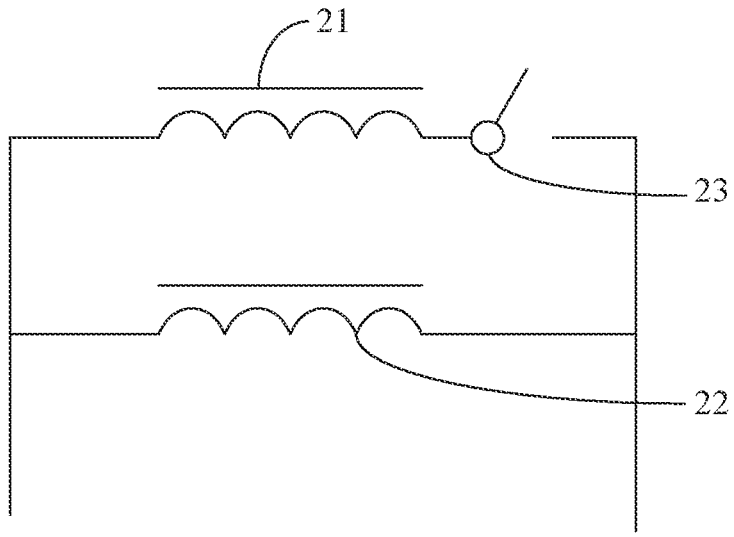
FIG. 3 is another circuit connection diagram of a first coil and a second coil of the vibration apparatus in FIG. 1.

Alternatively, referring to FIG. 3, the first coil 21 is connected in parallel to the second coil 22, and the first coil 21 is connected in series to the first switch 23. In this case, when the vibration apparatus needs to work as the sound generator, the first switch 23 is in the on state, and both the first coil 21 and the second coil 22 are in the electrified state; and when the vibration apparatus needs to work as the motor, the first switch 23 is in the off state, and the second coil 22 is in the electrified state. The first coil 21 and the second coil 22 may be electrified through connection to the circuit board in the mobile terminal, and on/off of the first switch 23 may be controlled by the processor in the mobile terminal, so as to control the vibration apparatus to work as the motor or the sound generator.

In FIG. 2 and FIG. 3, only one switch is shown as an example. It may be understood that electrifying of the first coil 21 and the second coil 22 may also be controlled by a plurality of switches.

Electrifying of the first coil 21 and the second coil 22 can be controlled by not only the integrated circuit board or processor in the mobile terminal, but also a separate switch circuit or switch module. This is not limited in the present disclosure. According to actual requirements, a new module or element may be designed, or an existing module or element in the mobile terminal may be reused. For example, the switch circuit includes a separate power supply. For another example, the switch circuit includes a plurality of control switches.

In this embodiment of the present disclosure, the first coil 21 and the second coil 22 are disposed coaxially. For example, one end of the first coil 21 is connected to one end of the second coil 22, and the first coil 21 and the second coil 22 are overlapped up and down.

In an optional implementation, the first coil 21 is sleeved on outside or inside of the second coil 22. As shown in FIG. 1, the first coil 21 is sleeved on the second coil 22. The first coil 21 and the second coil 22 may be bonded with each other. In this way, an overall occupied space of the coils is smaller, which facilitates downsizing of the vibration apparatus to reduce a space occupied by the vibration apparatus in the mobile terminal.

In this embodiment of the present disclosure, the vibration apparatus 30 includes a first magnetic piece 31 and a second magnetic piece 32. The accommodating groove 34 is formed in the first magnetic piece 31. The second magnetic piece 32 is adsorbed on a groove bottom of the accommodating groove 34, and at least in part disposed in a through hole formed by winding electrified wires of the at least two coils 20.

Referring to FIG. 1, the annular accommodating groove 34 is formed in the first magnetic piece 31. The first coil 21 and the second coil 22 are in part accommodated in the accommodating groove 34, but do not abut on the first magnetic piece 31. In other words, there is an interval between the coils and the groove bottom of the accommodating groove 34. The second magnetic piece 32 is adsorbed on the groove bottom of the accommodating groove 34, and in part disposed in a through hole formed by winding the electrified wire of the second coil 22. In this way, when the first coil 21 and/or the second coil 22 are/is electrified, the first coil 21 and/or the second coil 22 are/is stressed in a magnetic field to perform movement of cutting a magnetic induction line, and the first magnetic piece 31 and the second magnetic piece 32 move under the action of reaction force of Ampere force, thereby driving the elastic piece 40 to move. In addition, movement of the elastic piece 40 drives the substrate 10 to vibrate.

The magnetic component 30 further includes a magnetically conductive sheet 33. The magnetically conductive sheet 33 is disposed at one end of the second magnetic piece 32 that is away from the groove bottom of accommodating groove 34. Strength of a magnetic field of the second magnetic piece 32 can be enhanced due to arrangement of the magnetically conductive sheet 33.

Optionally, the vibration apparatus further includes an annular counterweight element 50. The counterweight element 50 is sleeved on the magnetic component 30, and abuts on the second side surface of the elastic piece 40.

Optionally, the vibration apparatus further includes a housing 60. The housing 60 is fixed on the substrate 10. The housing 60 and the substrate 10 form an accommodating space. All the at least two coils 20, the elastic piece 40 and the magnetic component 30 are accommodated in the accommodating space. Due to arrangement of the housing 60, the at least two coils 20, the elastic piece 40, the magnetic component 30 and the counterweight element 50 are protected, and magnetic fields can be isolated, thereby preventing an external device from affecting the at least two coils 20 and the magnetic component 30.

An embodiment of the present disclosure further provides a mobile terminal, including a display panel and the vibration apparatus according to the embodiment shown in FIG. 1 to FIG. 3. The substrate of the vibration apparatus abuts on an inner side of the display panel. The vibration apparatus has all technical features in the foregoing embodiment shown in FIG. 1 to FIG. 3, and can achieve a same technical effect. To avoid repetition, details are not described herein.

Figure 4:
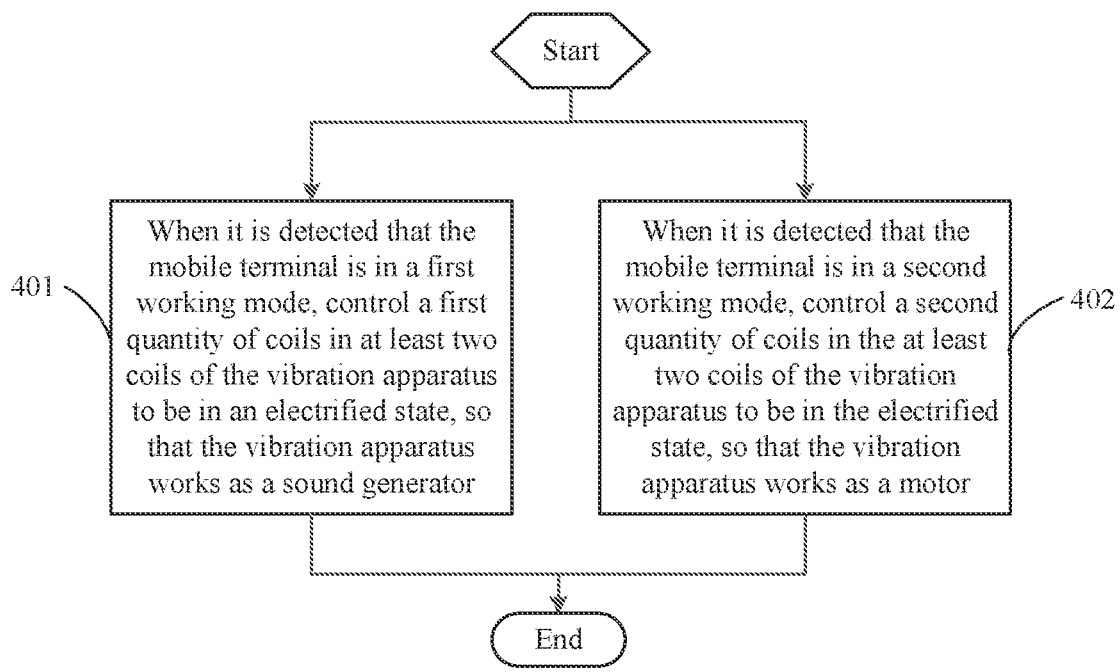
FIG. 4 is a flowchart of a method for controlling a mobile terminal according to an embodiment of the present disclosure.

Referring to FIG. 4, which is a flowchart of a method for controlling a mobile terminal according to an embodiment of the present disclosure. As shown in FIG. 4, the method for controlling a mobile terminal includes step 401 and step 402.

Step 401: When it is detected that the mobile terminal is in the first working mode, control a first quantity of coils in the at least two coils of the vibration apparatus to be in an electrified state, so that the vibration apparatus works as a sound generator.

It should be noted that, the vibration apparatus in this embodiment of the present disclosure at least includes all the technical features in the foregoing embodiment shown in FIG. 1 to FIG. 3, and can achieve a same technical effect. Details are not described herein.

It may be understood that, when the vibration apparatus woks as the sound generator, the value of Q needs to be small. Because the value of Q is inversely proportional to strength of a magnetic field of a coil and a length of an electrified wire of the coil, numbers of coils in the electrified state of the vibration apparatus needs to be large. In other words, when the mobile terminal is in the first working mode, the first quantity of the coils in the electrified state in the at least two coils of the vibration apparatus is a large value, to ensure that the value of Q of the vibration apparatus is small. For expressions of the value of Q, refer to the expression in the embodiment of the vibration apparatus shown in FIG. 1 to FIG. 3. Details are not described herein.

When working as the sound generator, the vibration apparatus can drive the display panel abutting thereon to vibrate for sounding. The first working mode may be a working mode in which the mobile terminal needs to sound, for example, a non-hands-free call mode or a voice message play mode. In this way, the mobile terminal can sound via the display panel. Compared with the related art in which a hole needs to be formed in a display panel for arrangement of a separate sounding apparatus, the technical solution provided in this embodiment of the present disclosure has the advantage that the display panel of the mobile terminal has a larger display area.

Step 402: When it is detected that the mobile terminal is in the second working mode, control a second quantity of coils in the at least two coils of the vibration apparatus to be in the electrified state, so that the vibration apparatus works as a motor.

The first quantity is not equal to the second quantity.

It may be understood that, when the vibration apparatus woks as the motor, the value of Q needs to be large. In this case, numbers of coils in the electrified state of the vibration apparatus needs to be small. In other words, when the mobile terminal is in the second working mode, the second quantity of the coils in the electrified state in the at least two coils of the vibration apparatus is a small value, to ensure that the value of Q of the vibration apparatus is large.

When the vibration apparatus works as the motor, vibration strength of the vibration apparatus is high, so that vibration strength of the mobile terminal is high. The first working mode may be a working mode in which the vibration strength of the mobile terminal needs to be high, for example, a call reminding vibration mode and a clock vibration mode.

In this embodiment of the present disclosure, the mobile terminal can control numbers of coils in the electrified state of the vibration apparatus for different working modes. In this way, the vibration apparatus can work as the sound generator when the mobile terminal is in the first working mode, and work as the motor when the mobile terminal is in the second working mode. In this way, functions of a motor and a sound generator can be implemented at the same time when there is only one vibration apparatus in a mobile terminal, which not only reduces hardware costs of the mobile terminal, but also saves an installation space in the mobile terminal. In addition, when working as a sound generator, the vibration apparatus can sound by driving the display panel to vibrate, that is, there is no need to form a hole in the display panel of the mobile terminal for arrangement of a separate sounding apparatus, so that the display panel of the mobile terminal can have a larger display area.

Optionally, an embodiment of the present disclosure further provides a mobile terminal, including a processor, a memory, and a program that is stored in the memory and that can run on the processor. When the program is executed by the processor, each process of the foregoing embodiment of the method for controlling a mobile terminal is implemented, and a same technical effect can be achieved. To avoid repetition, details are not described herein.

An embodiment of the present disclosure further provides a computer-readable storage medium. The computer-readable storage medium stores a program. When the program is executed by a processor, each process of the foregoing embodiment of the method for controlling a mobile terminal is implemented, and a same technical effect can be achieved. To avoid repetition, details are not described herein. The computer-readable storage medium may be a read-only memory (Read-Only Memory, ROM for short), a random access memory (Random Access Memory, RAM for short), a magnetic disk, a compact disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method in the embodiment may be implemented by using software plus a required universal hardware platform, or certainly may be implemented by using hardware. However, in many cases, the former is a better implementation. Based on such an understanding, the technical solutions of the present disclosure essentially or the part contributing to the related art may be implemented in a form of a software product. The computer software product is stored in a storage medium (such as a ROM/RAM, a hard disk, or a compact disc), and includes several instructions for instructing a terminal (which may be a mobile phone, a computer, a server, an air conditioner, a network device, or the like) to perform the method described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A vibration apparatus, comprising:
   a substrate abutting on a display panel of a mobile terminal, wherein the substrate is parallel to the display panel;
   at least two coils fixed on an inner side surface of the substrate, wherein the inner side surface faces away from the display panel, the at least two coils are disposed coaxially, and axes of the at least two coils are perpendicular to the substrate;
   an elastic piece, wherein a first side surface of the elastic piece abuts on the inner side surface of the substrate; and
   a magnetic component connected to a second side surface of the elastic piece, wherein the magnetic component comprises an accommodating groove, and the at least two coils are at least in part accommodated in the accommodating groove, wherein
   the second side surface is disposed away from the first side surface, the vibration apparatus has at least a first working mode and a second working mode, and numbers of coils electrified when the vibration apparatus is in the first working mode is not equal to numbers of coils electrified when the vibration apparatus is in the second working mode.

2. The vibration apparatus according to claim 1, wherein the at least two coils comprise a first coil and a second coil, both the first coil and the second coil are in an electrified state when the vibration apparatus is in the first working mode, and the first coil or the second coil is in the electrified state when the vibration apparatus is in the second working mode.

3. The vibration apparatus according to claim 2, wherein when the vibration apparatus is in the first working mode, the first coil is connected in series or in parallel to the second coil.

4. The vibration apparatus according to claim 2, wherein the first coil is sleeved on outside or inside of the second coil.

5. The vibration apparatus according to claim 1, wherein the magnetic component comprises a first magnetic piece and a second magnetic piece, the accommodating groove is formed in the first magnetic piece, the second magnetic piece is adsorbed on a groove bottom of the accommodating groove, and the second magnetic piece is at least in part disposed in a through hole formed by winding electrified wires of the at least two coils.

6. The vibration apparatus according to claim 5, wherein the magnetic component further comprises a magnetically conductive sheet, and the magnetically conductive sheet is disposed at one end of the second magnetic piece that is away from the groove bottom of the accommodating groove.

7. The vibration apparatus according to claim 1, wherein the vibration apparatus further comprises an annular counterweight element, and the counterweight element is sleeved on the magnetic component, and abuts on the second side surface of the elastic piece.

8. The vibration apparatus according to claim 1, wherein the vibration apparatus further comprises a housing, the housing is fixed on the substrate, the housing and the substrate form an accommodating space, and the at least two coils, the elastic piece and the magnetic component are all accommodated in the accommodating space.

9. A mobile terminal, comprising a display panel and a vibration apparatus, wherein the vibration apparatus comprises:
a substrate abutting, wherein the substrate is parallel to the display panel;
at least two coils fixed on an inner side surface of the substrate, wherein the inner side surface faces away from the display panel, the at least two coils are disposed coaxially, and axes of the at least two coils are perpendicular to the substrate;
an elastic piece, wherein a first side surface of the elastic piece abuts on the inner side surface of the substrate; and
a magnetic component connected to a second side surface of the elastic piece, wherein the magnetic component comprises an accommodating groove, and the at least two coils are at least in part accommodated in the accommodating groove, wherein
the second side surface is disposed away from the first side surface, the vibration apparatus has at least a first working mode and a second working mode, and numbers of coils electrified when the vibration apparatus is in the first working mode is not equal to numbers of coils electrified when the vibration apparatus is in the second working mode; and
the substrate of the vibration apparatus abuts on an inner side of the display panel.

10. The mobile terminal according to claim 9, wherein the at least two coils comprise a first coil and a second coil, both the first coil and the second coil are in an electrified state when the vibration apparatus is in the first working mode, and the first coil or the second coil is in the electrified state when the vibration apparatus is in the second working mode.

11. The mobile terminal according to claim 10, wherein when the vibration apparatus is in the first working mode, the first coil is connected in series or in parallel to the second coil.

12. The mobile terminal according to claim 10, wherein the first coil is sleeved on outside or inside of the second coil.

13. The mobile terminal according to claim 9, wherein the magnetic component comprises a first magnetic piece and a second magnetic piece, the accommodating groove is formed in the first magnetic piece, the second magnetic piece is adsorbed on a groove bottom of the accommodating groove, and the second magnetic piece is at least in part disposed in a through hole formed by winding electrified wires of the at least two coils.

14. The mobile terminal according to claim 13, wherein the magnetic component further comprises a magnetically conductive sheet, and the magnetically conductive sheet is disposed at one end of the second magnetic piece that is away from the groove bottom of the accommodating groove.

15. The mobile terminal according to claim 9, wherein the vibration apparatus further comprises an annular counterweight element, and the counterweight element is sleeved on the magnetic component, and abuts on the second side surface of the elastic piece.

16. The mobile terminal according to claim 9, wherein the vibration apparatus further comprises a housing, the housing is fixed on the substrate, the housing and the substrate form an accommodating space, and the at least two coils, the elastic piece and the magnetic component are all accommodated in the accommodating space.

17. A method for controlling a mobile terminal, applied to a mobile terminal, wherein the mobile terminal comprises a display panel and a vibration apparatus, the vibration apparatus comprises:
a substrate abutting on the display panel, wherein the substrate is parallel to the display panel;
at least two coils fixed on an inner side surface of the substrate, wherein the inner side surface faces away from the display panel, the at least two coils are disposed coaxially, and axes of the at least two coils are perpendicular to the substrate;
an elastic piece, wherein a first side surface of the elastic piece abuts on the inner side surface of the substrate; and
a magnetic component connected to a second side surface of the elastic piece, wherein the magnetic component comprises an accommodating groove, and the at least two coils are at least in part accommodated in the accommodating groove; and
the method comprises:
when it is detected that the mobile terminal is in the first working mode, controlling a first quantity of coils in the at least two coils of the vibration apparatus to be in an electrified state, so that the vibration apparatus works as a sound generator; and
when it is detected that the mobile terminal is in the second working mode, controlling a second quantity of coils in the at least two coils of the vibration apparatus to be in the electrified state, so that the vibration apparatus works as a motor, wherein
the first quantity is not equal to the second quantity.

* * * * *